United States Patent
Durrant et al.

(10) Patent No.: US 7,100,006 B2
(45) Date of Patent: Aug. 29, 2006

(54) METHOD AND MECHANISM FOR GENERATING A LIVE SNAPSHOT IN A COMPUTING SYSTEM

(75) Inventors: Paul Durrant, Slough (GB); Stephen R Hanson, Aldworth (GB)

(73) Assignee: Sun Microsystems, Inc., Santa Clara, CA (US)

( * ) Notice: Subject to any disclaimer, the term of this patent is extended or adjusted under 35 U.S.C. 154(b) by 991 days.

(21) Appl. No.: 10/051,498

(22) Filed: Jan. 18, 2002

(65) Prior Publication Data

US 2002/0093691 A1    Jul. 18, 2002

(30) Foreign Application Priority Data

Jul. 31, 2001    (GB) ................................. 0118659.2

(51) Int. Cl.
   *G06F 12/16* (2006.01)
(52) U.S. Cl. ............................. 711/162; 714/6; 714/20; 711/161
(58) Field of Classification Search ..................... None
   See application file for complete search history.

(56) References Cited

U.S. PATENT DOCUMENTS

| | | | |
|---|---|---|---|
| 5,497,483 A | | 3/1996 | Beardsley et al. |
| 5,535,381 A | * | 7/1996 | Kopper ........................ 710/52 |
| 5,644,701 A | * | 7/1997 | Takewaki ..................... 714/20 |
| 6,076,148 A | * | 6/2000 | Kedem ........................ 711/162 |
| 6,341,341 B1 | | 1/2002 | Grummon et al. |
| 6,434,681 B1 | * | 8/2002 | Armangau .................. 711/162 |
| 6,769,077 B1 | | 7/2004 | Vachon et al. |

FOREIGN PATENT DOCUMENTS

| | | |
|---|---|---|
| WO | 97/24667 | 7/1997 |
| WO | 97/24668 | 7/1997 |

OTHER PUBLICATIONS

International search report application No. GB 0018659.2, mailed Apr. 29, 2002.

* cited by examiner

*Primary Examiner*—B. James Peikari
(74) *Attorney, Agent, or Firm*—Meyertons Hood Kivlin Kowert & Goetzel, P.C.; Rory D. Rankin

(57) ABSTRACT

A method and mechanism for generating a snapshot in a computing system. On initiating a snapshot of a first storage, the content of a portion of the first storage that includes at least one block is copying to snapshot storage and a copied indication for each copied block is recording in a copy map. Responsive to any write request to a block for which no copied indication has been recorded in the copy map, the content of the block is copied to the snapshot storage, prior to writing to that block. The content of other blocks for which no copied indication has been recorded in the copy map is successively copied to the snapshot storage. A copied indication for each copied block is recorded in the copy map. The successive copying can be performed as a background task.

28 Claims, 8 Drawing Sheets

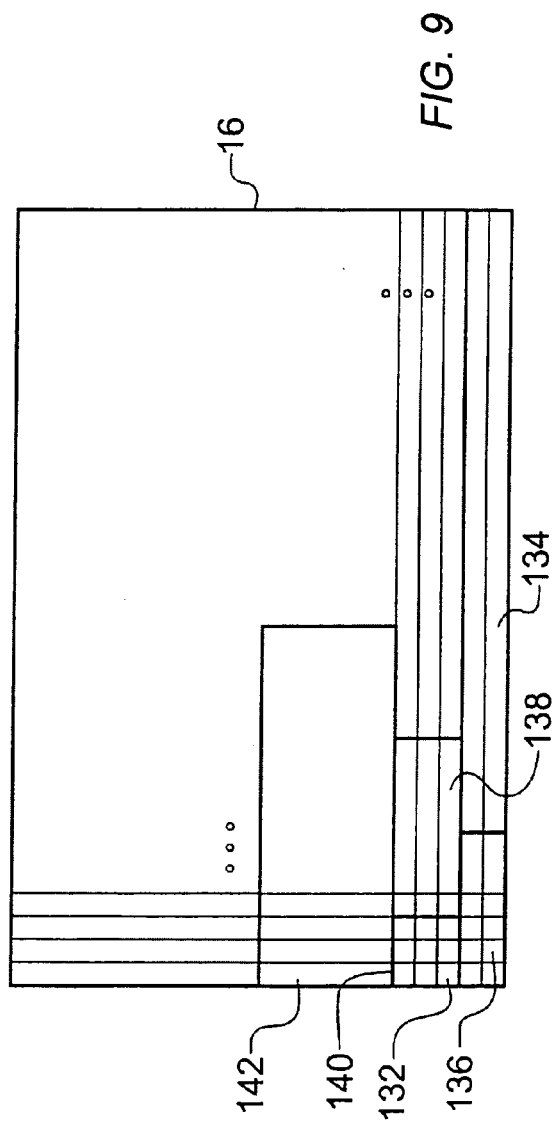

US 7,100,006 B2

METHOD AND MECHANISM FOR GENERATING A LIVE SNAPSHOT IN A COMPUTING SYSTEM

BACKGROUND OF THE INVENTION

The invention relates to an apparatus and method for providing a live memory snapshot.

There are times when it would be desirable to take a snapshot of the memory image of a running system. A simple dump of memory requires the suspension of all user and normal kernel activity for the entire time it takes to copy the system memory image to backing storage. If the memory is large, which is typically the case in a modern computer system, this can take some time. However, in many computer systems, it is not acceptable to suspend all user and normal kernel activity for any length of time. This is typically the situation in server computers, where the computer should ideally be active at all times, with minimal down-time.

The present invention seeks to provide a mechanism, system and method that can provide a live snapshot of a memory image of a live running computing system.

SUMMARY OF THE INVENTION

Particular aspects of the invention are set out in the accompanying independent and dependent claims.

An aspect of the invention provides a method of generating a snapshot of first storage that is logically subdivided into a plurality of blocks. The method comprises steps of:
  on initiating the snapshot, initially copying to snapshot storage the content of a portion of the first storage that includes at least one block and recording in a copy map a copied indication for each copied block;
  in response to any write request to a block for which no copied indication has been recorded in the copy map, copying to the snapshot storage the content of the block, prior to writing to it, and recording in the copy map a copied indication for the copied block; and
  successively copying to the snapshot storage the content of other blocks for which no copied indication has been recorded in the copy map and recording in the copy map a copied indication for each copied block,
  until the content of the plurality of blocks have been copied to the snapshot storage.

An embodiment of the invention is thus able to save a live memory snapshot with a minimum of interruption to the normal operation of the system.

Preferably, the initially copied storage portion includes any block containing part of an operating system kernel, whereby the whole kernel is copied in the initial step.

The copy map can be held in the first storage, in which case the initially copied storage portion should include any block that can contain part of the copy map. Alternatively, the copy map can be held in the same storage in an area that is not copied or indeed it could be held separately from the first storage.

The copy map can contain an indicator bit for each block of the first storage.

In one implementation, the indicator bit is set to form a copied indication for a block, e.g. to a value 1.

The first storage and the second storage can be formed from respective parts of a memory. Alternatively, the snapshot storage can be separate from a memory forming the first storage. In an embodiment the memory is a processor main memory and each block is a page of that memory.

In one implementation, the successive copying to the snapshot storage of the content of other blocks is performed as a background processing task so as to minimise the impact on system performance.

Another aspect of the invention provides a computer program comprising program code for generating a snapshot of first storage that is logically subdivided into a plurality of blocks, the program code being operable to carry out the steps of the method described above. A computer program product can comprise a carrier medium carrying the computer program code of the computer program.

A further aspect of the invention provides a computer system comprising first storage that is logically subdivided into a plurality of blocks, snapshot storage for holding a snapshot of the first storage; and a snapshot generator for generating a snapshot of the first storage, the snapshot generator being operable to carry out the steps of the method described above. The snapshot generator can be implemented as a computer program comprising computer code operable to control the computer system to perform the steps of the method.

BRIEF DESCRIPTION OF THE DRAWINGS

Embodiments of the present invention will be described hereinafter, by way of example only, with reference to the accompanying drawings in which like reference signs relate to like elements and in which:

FIG. 8 illustrates a translation table entry for the memory management unit referred to with reference to FIG. 7;

FIG. 9 is a schematic representation of the content of main memory;

DESCRIPTION OF PARTICULAR EMBODIMENTS

Embodiments of the present invention are described in the following with reference to the accompanying drawings.

Figure 1:
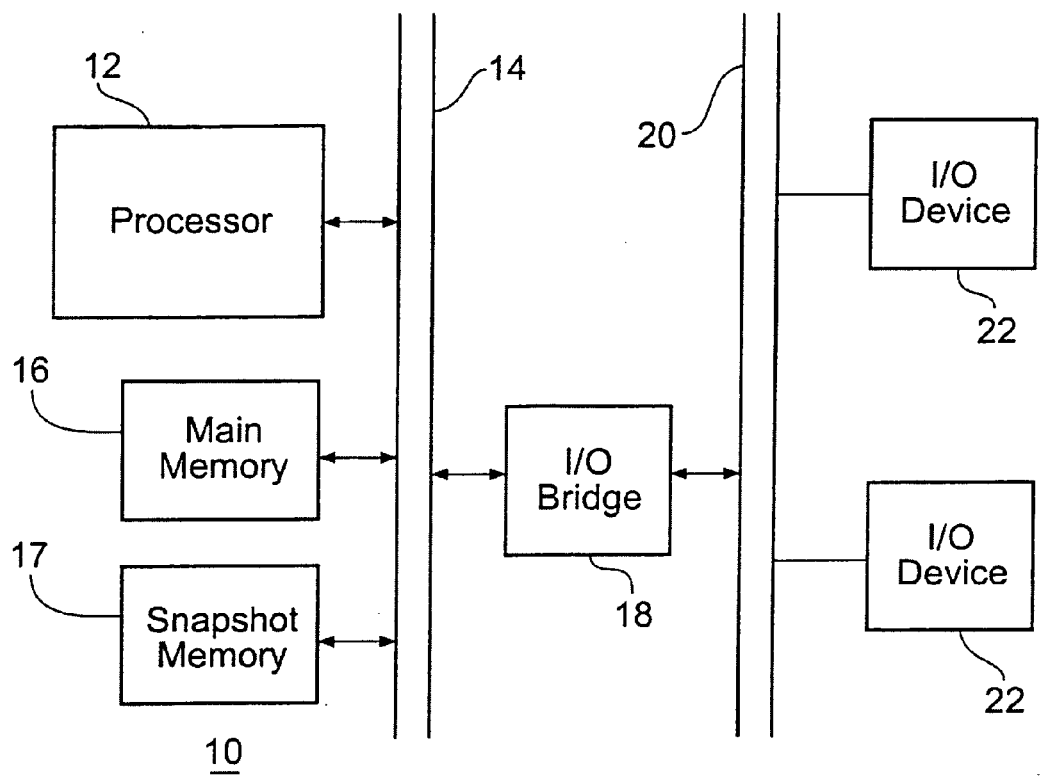
FIG. 1 is a schematic overview of a computer system forming an embodiment of the invention.

FIG. 1 is an overview of an embodiment of the invention in the form of a computer system 10 that includes a processor 12, a processor bus 14 to which are attached a plurality of subsystems including a main memory 16 that forms first storage, a second, snapshot memory 17 that forms second storage, and an I/O bridge 18. The processor 12 can typically be integrated in a single integrated circuit. The I/O bridge 18 provides an interface between the processor bus 14 and an I/O bus 20 to which a plurality of I/O devices 22 can be connected.

Figure 2:
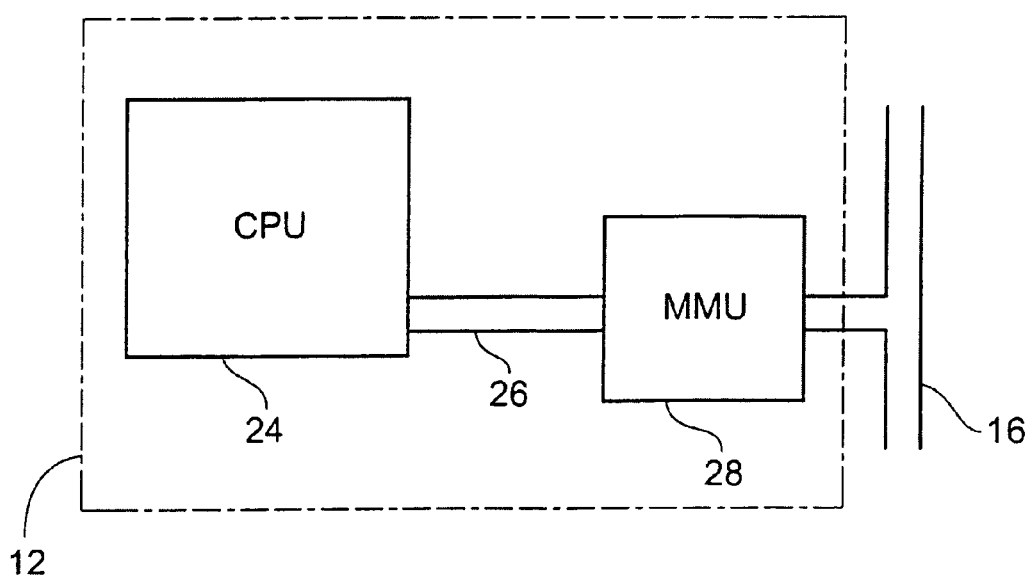
FIG. 2 is a schematic overview of a processor of the computer system of FIG. 1.

FIG. 2 is a schematic overview of a processor such as the processor 12 of FIG. 1. This includes a central processing unit (CPU) 24 connected via an internal bus 26 to a memory management unit (MMU) 28. The CPU 24 is operable to output virtual addresses on the internal bus 26 that are then converted by the MMU 28 into physical addresses for accessing system resources including the memory 16, the snapshot storage 17 and the I/O devices 22.

Figure 3:
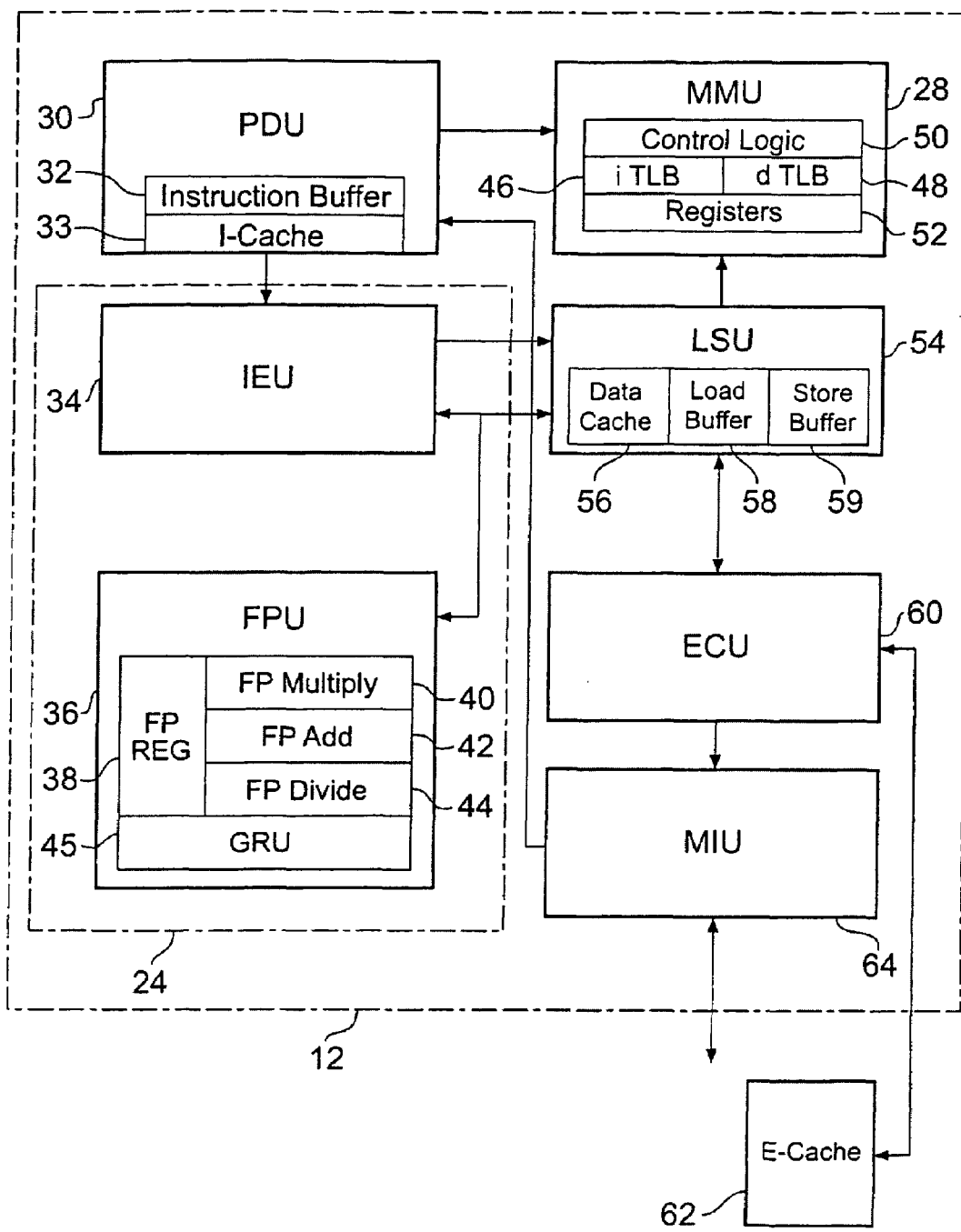
FIG. 3 is a schematic block diagram of a known type of processor.

FIG. 3 is a schematic block diagram of one type of processor 12, namely an UltraSPARC™ processor marketed by Sun Microsystems, Inc. Further details of the UltraSPARC™ processor can be found, for example, in the UltraSPARC™ I&II User's Manual, January 1997, available from Sun Microsystems, Inc, the content of which is incorporated herein by reference. The present invention can be implemented in a processor having the general overall structure of FIG. 3, although it should be appreciated that the invention could equally be implemented in processors having other structures.

In order to explain the present invention, there follows a description of the processor shown in FIG. 3.

The UltraSPARC™ processor is a high-performance, highly integrated superscalar processor implementing a 64-bit architecture. The processor pipeline is able to execute up to four instructions in parallel.

A Prefetch and Dispatch Unit (PDU) 30 fetches instructions before they are actually needed in the pipeline, so the execution units do not starve for instructions. Prefetched instructions are stored in the Instruction Buffer 32 until they are sent to the rest of the pipeline. An instruction cache (I-cache) 33 is a 16 Kbyte two-way set associative cache with 32 byte blocks.

An Integer Execution Unit (IEU) 34 includes two arithmetic logic units (ALUs), a multi-cycle integer multiplier, a multi-cycle integer divider, eight register windows, four sets of global registers (normal, alternate, MMU, and interrupt globals) and trap registers.

A Floating-Point Unit (FPU) 36 is partitioned into separate execution units, which allow two floating-point instructions to be issued and executed per cycle. Source and result data are stored in a 32-entry Floating-Point (FP) register file (FP Reg) 38. FP Multiply 40, FP Add 42 and FP Divide 44, are all catered for. A Graphics Unit (GRU) 45 provides a comprehensive set of graphics instructions.

The Memory Management Unit (MMU) 28 provides mapping between a 44-bit virtual address and a 41-bit physical address. This is accomplished through a 64-entry instructions translation look-aside buffer (iTLB) 46 for instructions and a 64-entry data translation look-aside buffer (dTLB) 48 for data under the control of MMU control logic 50. Both TLBs are fully associative. The control logic 50 also provides hardware support for a software-based TLB miss strategy. A separate set of global registers 52 is available to process MMU traps.

A Load/Store Unit (LSU) 54 is responsible for generating the virtual address of all loads and stores for accessing a data cache (D-Cache) 56, for decoupling load misses from the pipeline through a load buffer 58, and for decoupling stores through a store buffer 59.

An External Cache Unit (ECU) 60 handles I-Cache 33 and D-Cache 56 misses efficiently. The ECU 60 can handle one access per cycle to an External Cache (E-Cache) 62. The ECU 60 provides overlap processing during load and store misses. For instance, stores that hit the E-Cache 62 can proceed while a load miss is being processed. The ECU 60 can process reads and writes and also handle snoops. Block loads and block stores, which load/store a 64-byte line of data from memory to the floating-point register file, are also processed by the ECU 60 to provide high transfer bandwidth without polluting the E-Cache 62.

A Memory Interface Unit (MIU) 64 handles all transactions to the system controller, for example, external cache misses, interrupts, snoops, writebacks, and so on.

Figure 4:
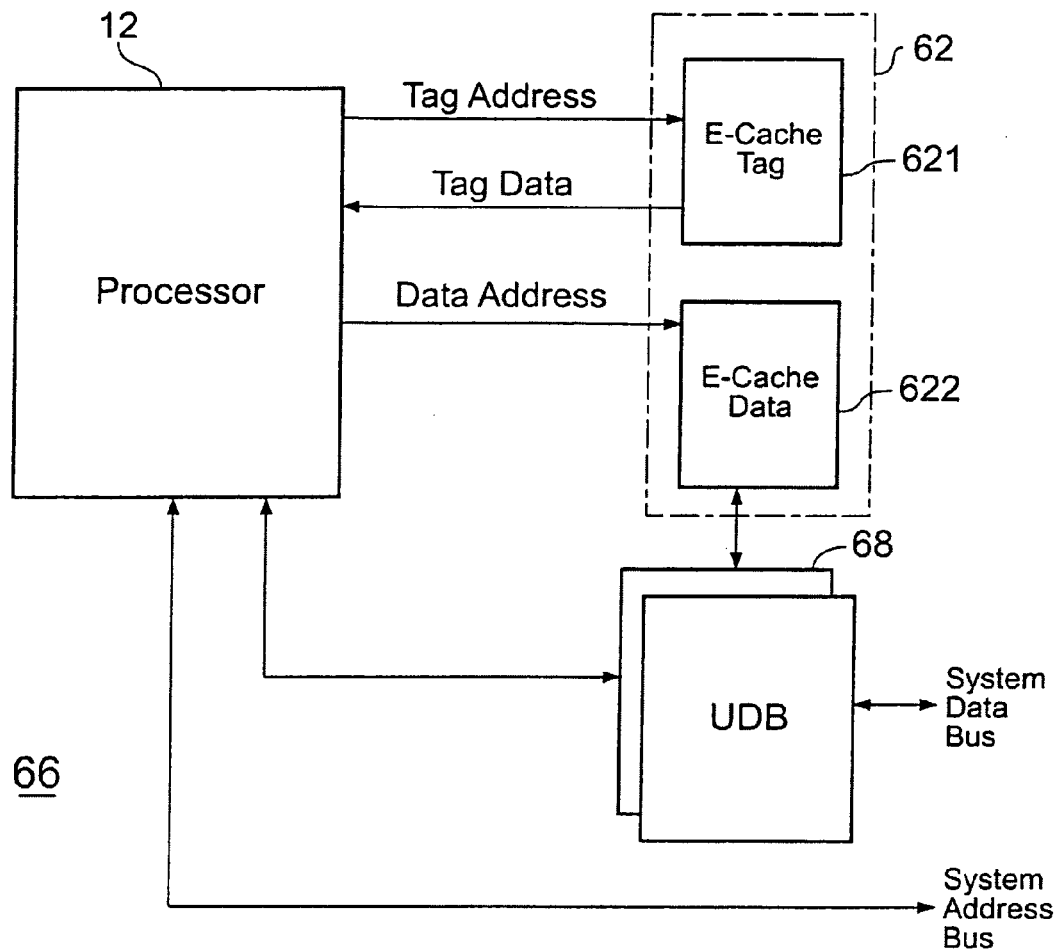
FIG. 4 is a schematic overview of a subsystem including the processor of FIG. 3.

FIG. 4 is a schematic overview of the UltraSPARC™ processor subsystem 66, which comprises the UltraSPARC™ processor 12, synchronous SRAM components for E-Cache tags and data 621 and 622, and two UltraSPARC™ data buffer (UDB) 68 chips. Typically, the processor 12 will be integrated in a single integrated circuit. The UDBs 68 isolate the E-Cache 62 from the system, provide data buffers for incoming and outgoing system transactions, and provide error correction code (ECC) generation and checking.

Figure 5:
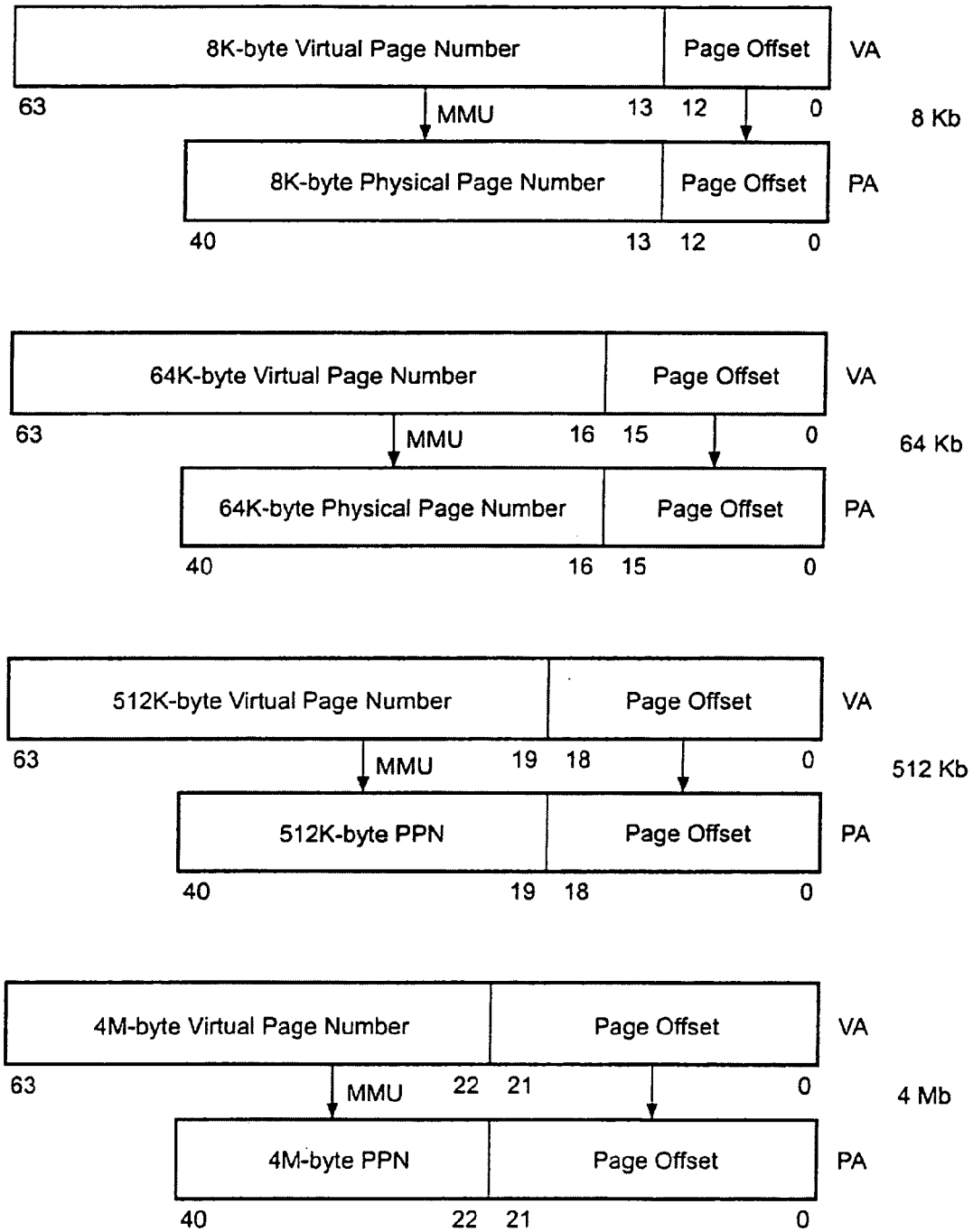
FIG. 5 illustrates virtual to physical address translation for the processor of FIG. 3.

There now follows a description of the Memory Management Unit (MMU) 28 as it is seen by operating system software. In this example, a 44-bit virtual address space is supported with 41 bits of physical address. During each processor cycle the MMU 28 provides one instruction and one data virtual-to-physical address translation. In each translation, the virtual page number is replaced by a physical page number, which is concatenated with the page offset to form the full physical address, as illustrated in FIG. 5 for each of four page sizes, namely 8 Kb, 64 Kb, 512 Kb, and 4 Mb. It should be noted that this Figure shows a full 64-bit virtual address, even though only 44 bits of Virtual Address (VA) are supported, as mentioned above.

Figure 6:
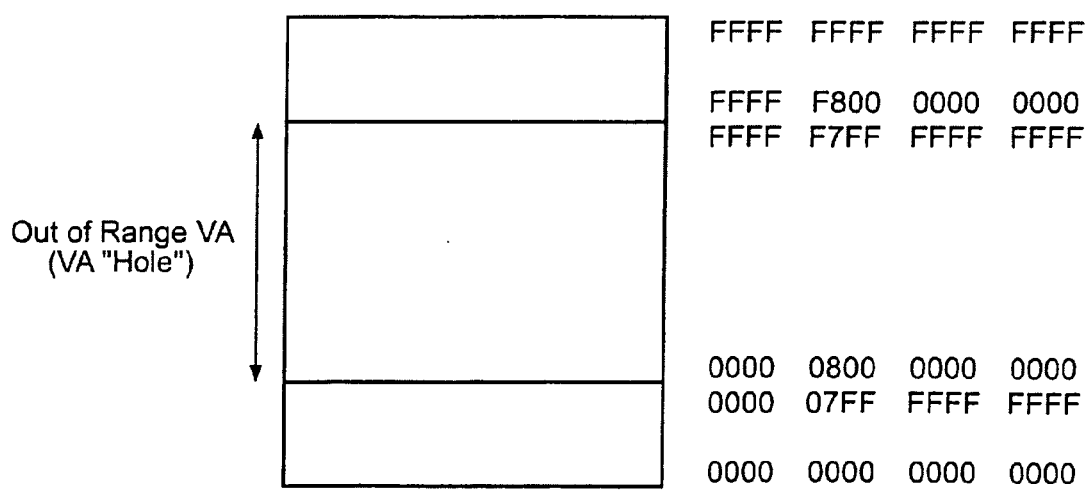
FIG. 6 illustrates an example of the relationship between virtual and physical address space for the processor of FIG. 3.

44-bit virtual address space is implemented in two equal halves at the extreme lower and upper portions of the full 64-bit virtual address space. Virtual addresses between 0000 0800 0000 0000$_{16}$ and FFFF F7FF FFFF FFFF$_{16}$, inclusive, are termed "out of range" and are illegal for the UltraSPARC™ virtual address space. In other words, virtual address bits VA<63:44> must be either all zeros or all ones. FIG. 6 illustrates the UltraSPARC™ virtual address space.

Figure 7:
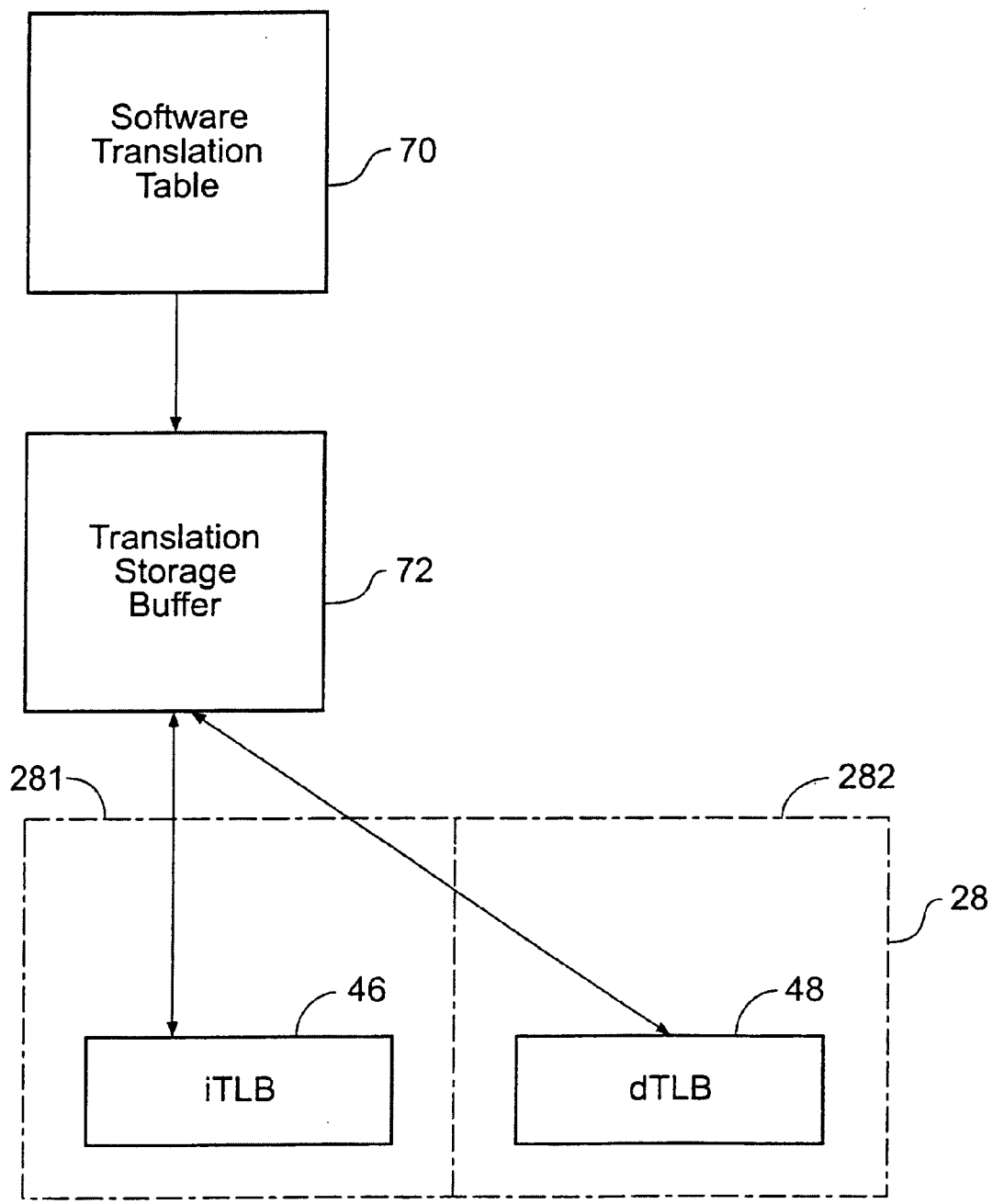
FIG. 7 is a schematic block diagram illustrating a software view of an example of the memory management unit of the processor of FIG. 3.

FIG. 7 is a block diagram illustrating the software view of the MMU 28. The operating system maintains translation information in a data structure called the Software Translation Table (STT) 70. The MMU 28 is effectively divided into an instruction MMU (I-MMU) 281 and a data MMU (D-MMU) 282. The I-MMU 281 includes the hardware instructions Translation Lookaside Buffer (iTLB) 46 and the D-MMU 282 includes the hardware data Translation Lookaside Buffer (dTLB) 48. These TLBs 46 and 48 act as independent caches of the Software Translation Table 70, providing one-cycle translation for the more frequently accessed virtual pages.

The STT 70, which is kept in memory, is typically large and complex compared to the relatively small hardware TLBs 46 and 48. A Translation Storage Buffer (TSB) 72, which acts like a direct-mapped cache, provides an interface between the STT 70 and the TLBs 46 and 48. The TSB 72 can be shared by all processes running on a processor, or it can be process specific.

When performing an address translation, a "TLB hit" occurs when a desired translation is present in the MMU's on-chip TLBs 46/48. A "TLB miss" occurs when a desired translation is not present in the MMU's on-chip TLBs 46/48. On a TLB miss the MMU 28 immediately traps to software for TLB miss processing. A software TLB miss handler has the option of filling the TLB by any means available, but it is likely to take advantage of TLB miss hardware support features provided by the MMU control logic 50, since the TLB miss handler is time critical code.

There now follows more information on the UltraSPARC™ Memory Management Unit (MMU) 28.

An example of an UltraSPARC™ Translation Table Entry (TTE) of the TSB 72 is shown in FIG. 8. This provides a translation entry that holds information for a single page mapping. The TTE is broken into two 64-bit words, representing the tag and data of the translation. Just as in a hardware cache, the tag is used to determine whether there is a hit in the TSB 72. If there is a hit, the data is fetched by software. The functions of fields of the tag and data words are described below.

Tag Word

G—This is a Global bit. If the Global bit is set, the Context field of the TTE is ignored during hit detection. This allows any page to be shared among all (user or supervisor) contexts running in the same processor. The Global bit is duplicated in the TTE tag and data to optimize the software miss handler.

Context—This is a 13-bit context identifier associated with the TTE.

VA-tag<63:22>—The Virtual Address tag is the virtual page number.

Data Word

V—This is a Valid bit. If the Valid bit is set, the remaining fields of the TTE are meaningful.

Size—This is the page size for this entry.

NFO—This is No-Fault-Only bit. If this bit is set, selected specific loads are translated, but all other accesses will trap with a data_access_exception trap.

IE—This is an Invert Endianness bit. If this bit is set, accesses to the associated page are processed with inverse endianness from what is specified by the instruction (big-for-little and little-for-big).

Soft<5:0>, Soft2<8:0>—These are software-defined fields provided for use by the operating system. The Soft and Soft2 fields may be written with any value.

Diag—This is a field used by diagnostics to access the redundant information held in the TLB structure. Diag<O>=Used bit, Diag<3:1>=RAM size bits, Diag<6:4>=CAM size bits.

PA<40:13>—This is the physical page number. Page offset bits for larger page sizes in the TTE (PA<15:13>, PA<18:13>, and PA<21:13> for 64 Kb, 512 Kb, and 4 Mb pages, respectively) are stored in the TLB and returned for a Data Access read, but are ignored during normal translation.

L—This is a Lock bit. If this bit is set, the TTE entry will be "locked down" when it is loaded into the TLB; that is, if this entry is valid, it will not be replaced by the automatic replacement algorithm invoked by an ASI store to the Data-In register.

CP, CV—These form cacheable-in-physically-indexed-cache and cacheable-in-virtually-indexed cache bits to determine the placement of data in UltraSPARC™ caches. The MMU does not operate on the cacheable bits, but merely passes them through to the cache subsystem.

E—This is a Side-effect bit. If this bit is set, speculative loads and FLUSHes will trap for addresses within the page, noncacheable memory accesses other than block loads and stores are strongly ordered against other E-bit accesses, and noncacheable stores are not merged.

P—This is a Privileged bit. If this bit is set, only the supervisor can access the page mapped by the TTE. If the P bit is set and an access to the page is attempted when PSTATE.PRIV=O, the MMU will signal an instruction_access_exception or data_access_exception trap ($FT=1_{16}$).

W—This is a Writeable bit. If the W bit is set, the page mapped by this TTE has write permission granted. Otherwise, write permission is not granted and the MMU will cause a data_access_protection trap if a write is attempted. The W-bit in the I-MMU is read as zero and ignored when written.

G—This is identical to the Global bit in the TTE tag word. The Global bit in the TTE tag word is used for the TSB hit comparison, while the Global bit in the TTE data word facilitates the loading of a TLB entry.

The above description of the UltraSPARC™ processor represents an example of a prior art processor. In the following, the application of an embodiment of the invention in the context of such a processor is to be described, it being understood that the invention can equally be applied to processors of alternative designs and configurations.

FIG. 9 is a schematic representation of an example of the contents 130 of the first storage 16. The first storage in the present instance is a random access memory that forms the active main memory 16 for the computer system 10. The first storage can be implemented using any appropriate memory technology. The main memory 16 is addressable in blocks 132, for example in pages of a given size (e.g., 8 KB), in a conventional manner. The blocks are represented schematically in FIG. 9. The contents of the memory can include an operating system 134, that including an operating system kernel 136, a snapshot computer program 138 for performing a live snapshot operation in accordance with an embodiment of the invention, a copy map 140, and other applications 142.

The snapshot storage 17 can also be implemented using conventional random access memory. Alternatively, the snapshot storage could be formed from a mass storage device such as hard disk, a writeable CD ROM, etc. The initial content of the snapshot storage 17 can be random or the content can be nul. After a snapshot of the first storage 16 has been taken, then the content of snapshot storage 17 will correspond to that of the first storage 16 at the time the snapshot was initiated.

Figure 10:
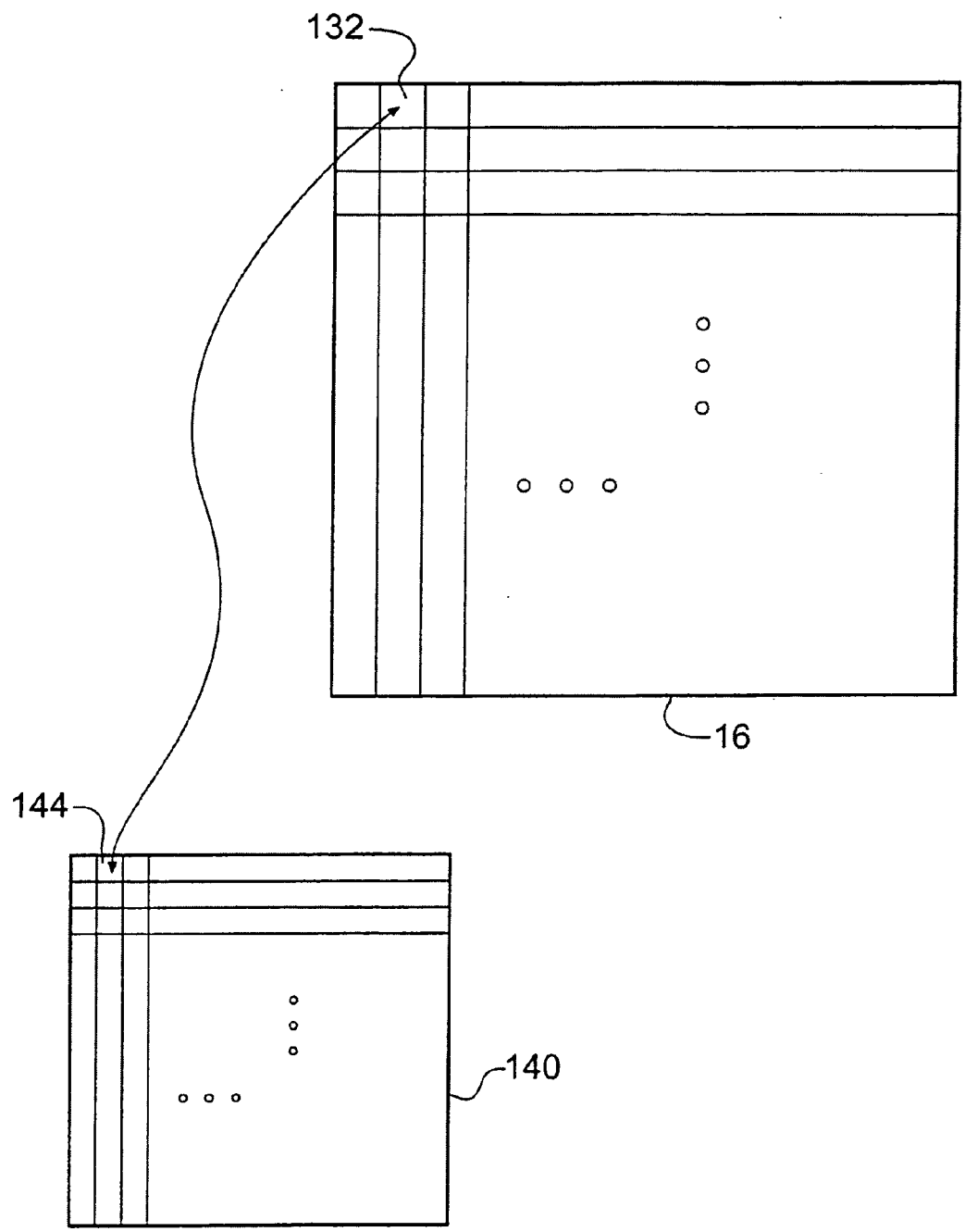
FIG. 10 is a schematic representation of the copy map.

FIG. 10 is a schematic representation of the copy map 140 illustrated in FIG. 9. In this embodiment the copy map 140 comprises a block copy indicator (e.g. a bit) 144 for each block 132 of the first storage 16. Each bit 144 in the copy map 140 is used to indicate whether a corresponding block 132 in the main memory 16 has been copied to the snapshot storage 17. At the initiation of a snapshot, each block copy indicator in the copy map 140 is reset to a reset value (say 0), and then, when a block from the first storage is copied to the snapshot storage, the corresponding block copy indicator in the copy map is set to a set value (e.g. 1).

Figure 11:
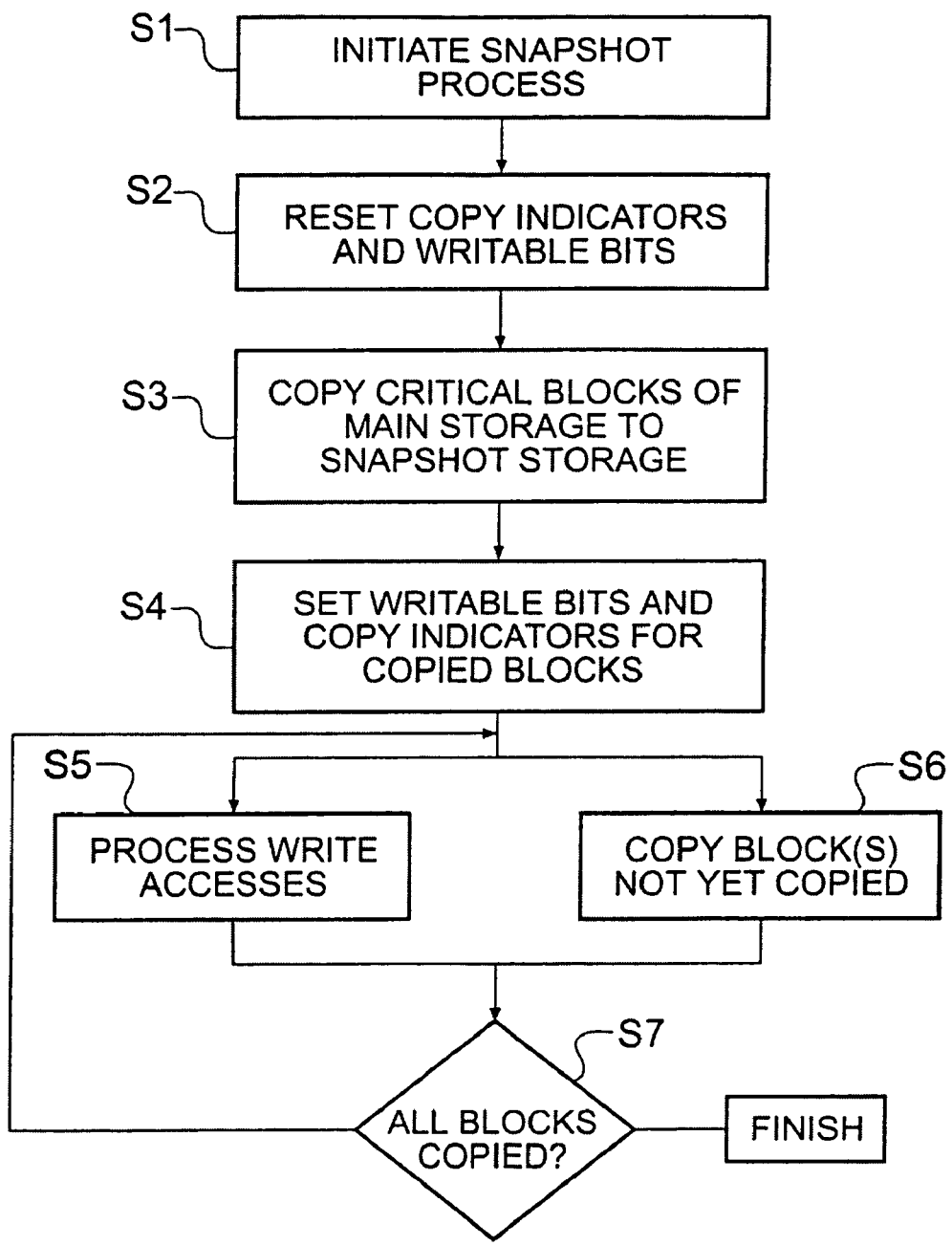
FIG. 11 is flow diagram illustrating the operation of a snapshot process in accordance with an embodiment of the invention.

FIG. 11 is a flow diagram illustrating the processes performed by the snapshot computer program 138.

Step S1 represents the initiation of the snapshot process. This can be achieved in response to the snapshot program 138 being initiated in response to a user input, a system event such as a scheduled task, etc.

In step S2, the snapshot program 138 is operative to cause all of the block copy indicators 144 of the copy map to be reset to the reset value. Also, the Writeable bits W in the TTEs are reset indicating that writes to the pages mapped by those TTEs is not granted. If a write is made to a page address for which write permission is not granted, the MMU will cause a data_access_protection trap to be taken. In this way the snapshot program 38 causes all operating system accesses to the first storage to be suspended.

Optionally, direct memory accesses by IO can be suspended if suitable hardware support is provided for this in the computer system. For example, a slot register (not shown) can be provided in the IO bridge 18 for each slot on the IO bus 20 that can receive an IO device 22. The content of the slot register can be set to indicate whether DMA operations are allowed or not by the corresponding IO device 22 at any particular time. Thus, in order to suspend DMA operations, the content of all of the slot registers could be set to a state indicating that DMA operations are not allowed. However, it should be noted that in some embodiments it may not be possible to suspend such IO operations.

In step S3, the snapshot program 38 copies any block 32 of the first storage 16 that has a content relating to the operating system kernel 36 to an equivalent location in the snapshot storage 17. In view of this any block containing the kernel is copied to the snapshot storage with the content it had at a given time following initiation of the snapshot. During this step, any operating system write operations to the first storage 16 are prevented.

In one implementation, the snapshot program 38 also copies any block 32 of the first storage 16 that contains addresses that can be accessed by IO DMA operations to an equivalent location in the snapshot storage 17. If, as mentioned above, if it is possible in a particular implementation to suspend IO DMA operations at step S2, then this the copying of any block that contains addresses that can be accessed by IO DMA operations can be done without any IO DMA operations being attempted.

If it is not possible to suspend IO DMA operations in a particular embodiment of the invention, then it will be appreciated that step S3 should be performed as quickly as possible to reduce the risk of an IO DMA operation being attempted.

Optionally, to address this issue, any block that contains addresses that can be written to by IO DMA operations can be deemed to be outside an area of the first memory to be copied and can thus be excluded completely from the copy operation. Alternatively, any such block could be marked or otherwise recognised by the system (e.g. through a table (not shown) identifying such blocks) as potentially unreliable for embodiments where IO DMA operations cannot be suspended.

If the copy map is held in the part of the first storage to be copied, then any block 32 of the first storage 16 that has a content relating to the copy map 40 could also be copied to an equivalent location in the snapshot storage 17.

However, it is advantageous for the copy map to be held outside an area of the first memory to be copied and/or separate from the first memory, for example in the MMU. The reason for this is that it is desirable to keep the amount of data to be copied in step S3 as small as possible, so that step S3 lasts as short a time as possible, particularly in an embodiment where IO DMA operations cannot be suspended.

At the end of step S3, if in a particular embodiment it is possible to suspend IO DMA operations, for example through the operation of slot registers as described above, then IO DMA accesses are once again allowed by resetting the slot registers to permit IO DMA operations.

In step S4, the snapshot program then sets the Writeable bits for the blocks that have been copied in the MMU TTEs. This then enables the snapshot memory to update the copy map (wherever it is held) to set each of the copy indicators in the copy map that correspond to the blocks of the first storage 16 that have been copied to the snapshot storage 17.

At this stage (step S5) the memory management unit is operable to verify for any operating system write access to any block in the first storage whether it can directly write to the main memory, as the Writeable bit for that block will be set. If the Writeable bit is set in the TTE corresponding to a received virtual address, then write access is permitted as this means that the block has already been transferred to the snapshot storage. If the Writeable bit is not set, then this means that the corresponding block of storage has not yet been copied to storage. In this case, the MMU causes a data_access_protection trap to be taken. This trap points to part of the snapshot program code that then causes the block of the main memory to be copied to an equivalent location in the snapshot storage, causes the corresponding copy indicator in the copy map to be set and causes the Writeable bit to be set in the appropriate MMU TTE, and then allows the write access being permitted to that block. In this way, it is ensured that each block to which write access is to be made is copied to the snapshot storage with the content it had at the aforementioned given time following initiation of the snapshot.

Any IO DMA write accesses will be allowed at this stage because they will either be to an area of memory that has already been copied, or to an area that is deemed to be outside of the area of the first memory to be copied, according to the particular implementation as discussed above.

In step S6, the snapshot program is operable as a background task to sequence through the copy map to identify a copy indicator that has not been set, this being indicative of a block of the first memory that has not yet been copied to the snapshot storage. The snapshot program is then operable to copy that block, which will have the same content as at the aforementioned given time following initiation of the snapshot, to an equivalent location in the snapshot storage, to set the corresponding copy indicator in the copy map and to set Writeable bit in the appropriate TTE in the MMU.

Steps S5 and S6 effectively operate in parallel, with instances of step S5 being performed as a foreground task and step S6 being performed as a background task.

Steps S5 and S6 continued in parallel as appropriate until the snapshot program 38 determines in step S7 that all of the copy indicators have been set, this being indicative of all of the blocks of the first memory having being copied to the snapshot memory.

There has been described a method and apparatus that enables a live snapshot of a first storage that is logically subdivided into a plurality of blocks to be generated in a running computer system a manner that minimises the impact on the running of the computer system. On initiating the snapshot, the content of a portion of the first storage that includes at least one block is copying to snapshot storage and a copied indication for each copied block is recording in a copy map. In response to any write request to a block for which no copied indication has been recorded in the copy map, the content of the block is copied to the snapshot storage, prior to writing to that block. A copied indication for the copied block is also recorded in the copy map. The content of other blocks for which no copied indication has been recorded in the copy map is successively copied to the snapshot storage. A copied indication for each copied block is also recorded in the copy map. This process then continues until the content of all of the plurality of blocks has been copied to the snapshot storage. The successive copying can be performed as a background task.

Although a particular embodiment of the invention has been described, it will be appreciated that the many modifications to the embodiment and alternative embodiments can be envisaged within the spirit and scope of the claimed invention.

For example, in the example described above, the copy memory is configured as part of the first storage (in the described example, the main memory of the processor). However, in another example, it could be configured as a separate memory accessible over the processor bus. As a further alternative, it could be configured as an integral part of the memory management unit.

Moreover, the snapshot memory is shown as a separate memory via the processor bus. However, the snapshot storage could be part of the same memory as the first storage (for example, they could relate to separate partitions or portions of the main memory). As a further alternative, the snapshot storage could be configured in mass storage, for example on a read-writeable disk. In such a case, the data from the copied blocks could be stored with information defining the location of the blocks from the first storage, whereby the content of the first storage could be reconfigured later.

What is claimed is:

1. A method of generating a snapshot of first storage that is logically subdivided into a plurality of blocks, the method comprising:
   on initiating the snapshot, initially copying to snapshot storage the content of a portion of the first storage that includes at least one block and recording in a copy map a copied indication for each copied block;
   in response to any write request to a block for which no copied indication has been recorded in the copy map, copying to the snapshot storage the content of the block, prior to writing to it, and recording in the copy map a copied indication for the copied block; and
   successively copying to the snapshot storage the content of other blocks for which no copied indication has been recorded in the copy map and recording in the copy map a copied indication for each copied block, until the content of the plurality of blocks have been copied to the snapshot storage;
   wherein the initially copied storage portion includes one or more blocks containing part of an operating system kernel.

2. The method of claim 1, wherein the copy map is held in the first storage and the initially copied storage portion includes any block containing part of the copy map.

3. The method of claim 1, wherein the copy map is held separately from the first storage.

4. The method of claim 1, wherein the initially copied storage portion includes any block that can be written to by an IO DMA operation.

5. The method of claim 1, wherein the copy map contains an indicator bit for each block of the first storage.

6. The method of claim 5, wherein an indicator bit is set to form a copied indication for a block.

7. The method of claim 1, wherein the first storage and a second storage are formed from respective parts of a memory.

8. The method of claim 1, wherein the first storage is a memory and the snapshot storage is separate from the memory.

9. The method of claim 7, wherein the memory is a processor main memory.

10. The method of claim 7, wherein each block is a page of the first storage.

11. The method of claim 1, wherein the successive copying to the snapshot storage of the content of other blocks is performed as a background processing task.

12. A carrier medium comprising program instructions, wherein the program instructions are executable:
    on initiating a snapshot, initially to copy to snapshot storage the content of a portion of a first storage that includes at least one block and recording in a copy map a copied indication for each copied block;
    in response to any write request to a block for which no copied indication has been recorded in the copy map, to copying to the snapshot storage the content of the block, prior to writing to it, and to recording in the copy map a copied indication for the copied block; and
    successively to copying to the snapshot storage the content of other blocks for which no copied indication has been recorded in the copy map and recording in the copy map a copied indication for each copied block, until the content of the plurality of blocks has been copied to the snapshot storage;
    wherein the initially copied storage portion includes one or more blocks containing part of an operating system kernel.

13. The carrier medium of claim 12, wherein the copy map is held in the first storage and wherein the initially copied storage portion includes any block containing part of the copy map.

14. The carrier medium of claim 12, wherein the copy map is held separately from the first storage.

15. The carrier medium of claim 12, wherein the initially copied storage portion includes any block that can be written to by an IO DMA operation.

16. The carrier medium of claim 12, wherein the copy map contains an indicator bit for each block of the first storage and wherein an indicator bit is set to form a copied indication for a block.

17. The carrier medium of claim 12, wherein the successive copying to the snapshot storage of the content of other blocks is performed as a background processing task.

18. A computer system comprising:
    first storage that is logically subdivided into a plurality of blocks;
    snapshot storage for holding a snapshot of the first storage; and
    a snapshot generator for generating a snapshot of the first storage, the snapshot generator being operable, on initiating the snapshot to
    initially copying to the snapshot storage the content of a portion of the first storage that includes at least one block and recording in a copy map a copied indication for each copied block;
    in response to any write request to a block for which no copied indication has been recorded in the copy map, copying to the snapshot storage the content of the block, prior to writing to it, and recording in the copy map a copied indication for the copied block; and
    successively copying to the snapshot storage the content of other blocks for which no copied indication has been recorded in the copy map and recording in the copy map a copied indication for each copied block, until the content of the plurality of blocks has been copied to the snapshot storage;

wherein the initially copied storage portion includes one or more blocks containing part of an operating system kernel.

19. The computer system of claim 18, wherein the copy map is held in the first storage and the initially copied storage portion including any block containing part of the copy map.

20. The computer system of claim 18, wherein the copy map is held separately from the first storage.

21. The computer system of claim 18, wherein the initially copied storage portion includes any block that can be written to by an IO DMA operation.

22. The computer system of claim 18, wherein the copy map contains an indicator bit for each block of the first storage.

23. The computer system of claim 18, wherein an indicator bit is set to form a copied indication for a block.

24. The computer system of claim 18, wherein the first storage and the second storage are formed from respective parts of a memory.

25. The computer system of claim 18, wherein the first storage is a memory and the snapshot storage is separate from the memory.

26. The computer system of claim 24, wherein the memory is a processor main memory.

27. The computer system of claim 24, wherein each block is a page of the first storage.

28. The computer system of claim 18, wherein the successive copying to the snapshot storage of the content of other blocks is performed as a background processing task.

* * * * *